United States Patent
Aubourg

(10) Patent No.: US 7,331,235 B2
(45) Date of Patent: Feb. 19, 2008

(54) DEVICE FOR INDICATING A BEAT LEVEL

(75) Inventor: Pierre-Antoine Aubourg, Marseille (FR)

(73) Assignee: Eurocopter, Marignane (FR)

( * ) Notice: Subject to any disclaimer, the term of this patent is extended or adjusted under 35 U.S.C. 154(b) by 244 days.

(21) Appl. No.: 11/149,299

(22) Filed: Jun. 10, 2005

(65) Prior Publication Data

US 2006/0029499 A1    Feb. 9, 2006

(30) Foreign Application Priority Data

Jun. 10, 2004  (FR)  ................................. 04 06275

(51) Int. Cl.
G01M 13/02 (2006.01)
G01M 1/22 (2006.01)

(52) U.S. Cl. .................. 73/660; 73/593; 244/17.13

(58) Field of Classification Search .............. 73/660
See application file for complete search history.

(56) References Cited

U.S. PATENT DOCUMENTS

| | | | |
|---|---|---|---|
| 4,519,743 A | 5/1985 | Ham | |
| 5,316,240 A | 5/1994 | Girard et al. | |
| 6,076,405 A * | 6/2000 | Schoess | 73/587 |
| 6,176,136 B1 * | 1/2001 | Zoppitelli et al. | 73/660 |
| 6,311,924 B1 | 11/2001 | Ferrer | |
| 6,768,938 B2 * | 7/2004 | McBrien et al. | 701/100 |
| 2003/0196492 A1 * | 10/2003 | Remboski et al. | 73/593 |

FOREIGN PATENT DOCUMENTS

| | | |
|---|---|---|
| EP | 0 601 527 A | 6/1994 |
| FR | 2 692 668 A1 | 12/1993 |
| FR | 2 824 394 A1 | 11/2002 |

* cited by examiner

*Primary Examiner*—Hezron Williams
*Assistant Examiner*—Rose M Miller
(74) *Attorney, Agent, or Firm*—Young & Thompson

(57) ABSTRACT

A device for indicating a beat level L, the device including an analyzer which responds to a reference frequency $\Omega$ and a harmonic coefficient B to extract from an evaluation signal E a first acceleration signal $\gamma_B$ at a frequency equal to the product of reference frequency $\Omega$ multiplied by harmonic coefficient B; and a second acceleration signal $\gamma_{B-1}$ at a frequency equal to the product of reference frequency $\Omega$ multiplied by the harmonic coefficient minus one; and it further includes a control circuit CC which receives acceleration signal $\gamma_B$, $\gamma_{B-1}$ to produce beat level L.

15 Claims, 1 Drawing Sheet

DEVICE FOR INDICATING A BEAT LEVEL

The field of the invention is that of analyzing vibration within a vehicle, more particularly when the vehicle is provided with an engine driving a rotary propulsion member. A typical example of an application of the invention is a helicopter, a vehicle which presents a high level of vibration, essentially due to the main rotor which serves to provide both lift and propulsion.

BACKGROUND OF THE INVENTION

It is important to characterize the vibration present in such a vehicle, since the vibration is representative of stresses that lead to fatigue phenomena in various materials and that therefore have a direct influence on safety. Vibration may also degrade the performance of various items of equipment installed in the vehicle. In addition, vibration in the cabin of a helicopter determines the comfort of the passengers and of the pilot, and it goes without saying that pilot comfort is also an essential element for safety.

A system is thus known for continuously recording vibration within a helicopter, said system being known as a health usage and monitoring system (HUMS). The system records an alarm in a removable monitoring cartridge whenever the level of vibration exceeds a predetermined threshold at an identified frequency $\Omega$, $2\Omega$, or $B\Omega$, where $\Omega$ represents the speed of rotation of the rotor and B the number of blades mounted on the rotor.

It is also known to balance a rotor in order to reduce vibration in the cabin at each of the harmonics of the fundamental frequency $\Omega$, with the exception of the harmonic B.

Nevertheless, at present, no means are provided for providing an indication of a level of vibration without being restricted to an identified frequency, i.e. no means are available that tend rather to take account of the overall behavior of the rotor.

OBJECTS AND SUMMARY OF THE INVENTION

An object of the present invention is thus to provide a device that indicates a level of vibration making it possible to assess an equilibrium defect that cannot be detected by simple frequency analysis.

According to the invention, the indicator device for indicating a beat level comprises:

analyzer means which respond to a reference frequency and to a harmonic coefficient to extract the following from an evaluation signal:
  a first acceleration signal at a frequency equal to the product of the reference frequency multiplied by said harmonic coefficient; and
  a second acceleration signal at a frequency equal to the product of the reference frequency multiplied by the harmonic coefficient minus one;
and a control circuit which receives the acceleration signals in order to produce the beat level.

In addition, the device includes a comparator which produces a warning signal if the beat level exceeds a predetermined threshold.

Firstly, the beat level is symptomatic of an anomaly on one or more of the moving members of the rotor, for example a blade, a pitch control link, a lag damper or adaptor, or a hinge (a ball bearing or a laminated abutment).

Secondly, the beat induces a virtual unbalance sensation in the cabin which is particularly uncomfortable for the crew and the passengers of the helicopter.

It follows that indicating the beat level is fundamental in terms of vehicle maintenance.

In a preferred embodiment, the beat level is a function of the difference between firstly the $n^{th}$ power of one of said acceleration signals and secondly the other acceleration signal.

Preferably, the beat level is equal to the ratio of the $n^{th}$ power of one of said acceleration signals divided by the other acceleration signal.

Advantageously, the value of $n$ is equal to 2.

According to an additional characteristic of the device, the evaluation signal is taken from a vibration sensor.

The device further comprises a concentrator member for producing the evaluation signal in response to a plurality of measurement signals, each coming from a distinct vibration sensor.

In a first option, the evaluation signal is equal to the sum of the measurement signals.

In a second option, the evaluation signal is the greatest of the measurement signals.

In addition, the reference frequency is taken from a speed of rotation sensor.

The invention applies in particularly advantageous manner to a helicopter, in which case the speed of rotation is the speed of rotation of the main rotor, and the harmonic coefficient is equal to the number of blades of said rotor.

According to another aspect, the invention provides a device for indicating a beat level L of a rotary wing aircraft having a rotor with a plurality of blades, the device comprising:

a vibration sensor S1, S2, S3 for measuring vibration on board the aircraft;

a speed sensor T for measuring the speed of rotation of the rotor, the speed sensor providing a reference signal having a reference frequency $\Omega$;

a synchronous analysis means FT for synchronously analysing harmonic components of a vibration signal E derived from the vibration sensor, the synchronous analysis means FT being connected to the vibration sensor and to the speed sensor, the synchronous analysis means FT being arranged to extract from the vibration signal E:
  i) a first harmonic component $\gamma_B$ of frequency $B\Omega$ equal to the product of said reference frequency $\Omega$ multiplied by a harmonic coefficient B equal to the number of blades of the rotor, and
  ii) a second harmonic component $\gamma_{B-1}$ of frequency $(B-1)\Omega$ equal to the product of said reference frequency $\Omega$ multiplied by said harmonic coefficient B minus one;

a control circuit DC connected to the synchronous analysis means FT, the control circuit receiving said first and second harmonic components and outputting a beat level L.

BRIEF DESCRIPTION OF THE DRAWING

The present invention is described below in greater detail in the context of the following description of an embodiment given by way of illustration and made with reference to the sole accompanying figure which is a block diagram of the device.

MORE DETAILED DESCRIPTION

Figure 1:
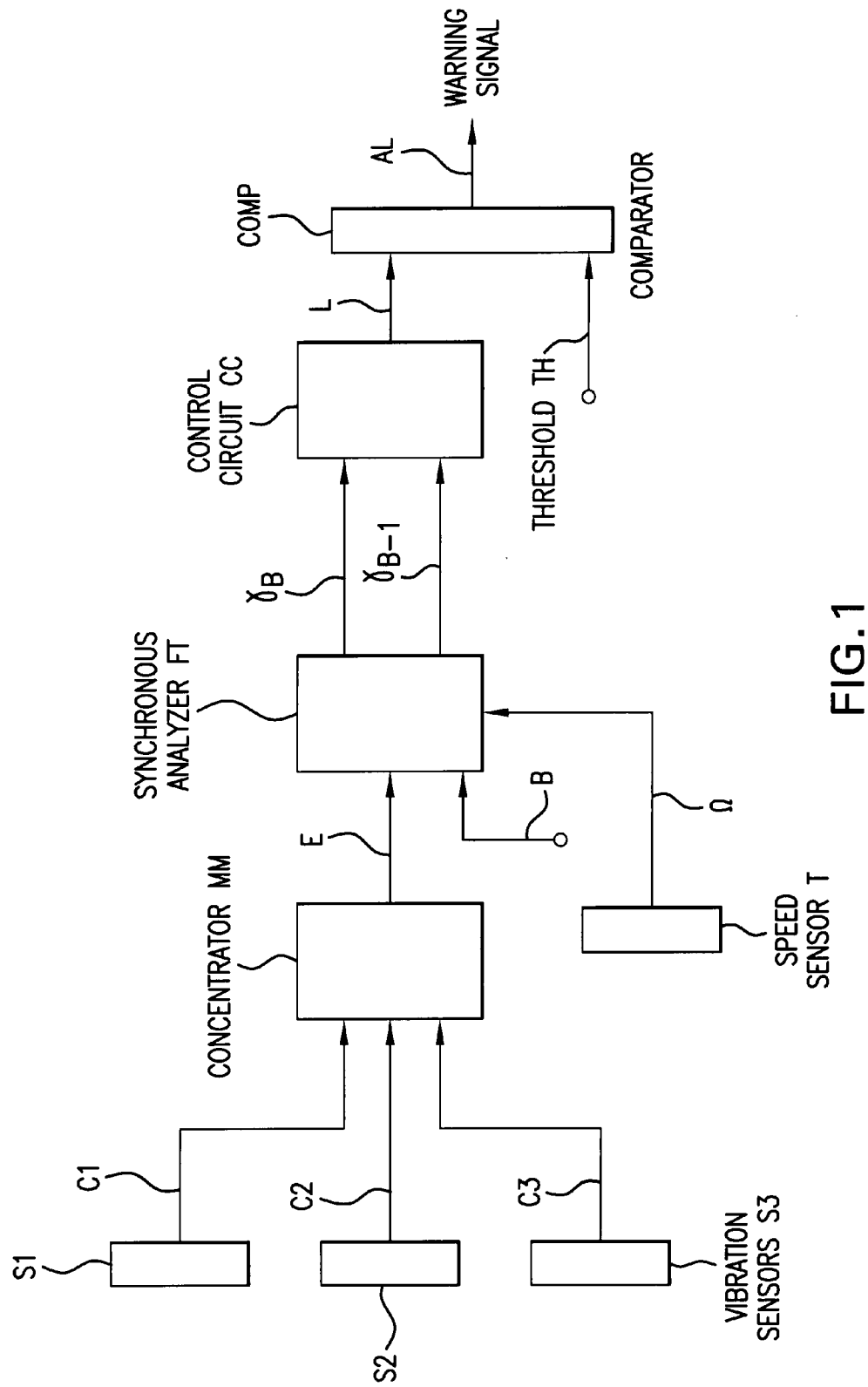

With reference to the figure, first, second, and third sensors S1, S2, and S3 are disposed in the cabin of a helicopter to measure vibration. These three sensors deliver respective first, second, and third measurement signals C1, C2, and C3 representing the acceleration to which each of them is subjected. The sensors are preferably accelerometers or strain gauges.

A concentrator member MM receives the three measurement signals C1, C2, and C3 in order to combine them (using some function) into an evaluation signal E.

In a first option, it sums the measurement signals.

In a second option, it takes as the evaluation signal, the greatest of the measurement signals.

It is appropriate to observe that the invention also applies when only one sensor is provided, in which case it delivers the evaluation E directly, and the concentrator member MM is omitted.

A tachometer T delivers the speed of rotation $\Omega$ of the main rotor of the helicopter.

Analyzer means FT transposes the evaluation signal E from the time domain to the frequency domain. It has access to the speed of rotation $\Omega$ of the rotor and to the number B of blades of said rotor in order to produce a first acceleration signal $\gamma_B$ which represents the spectral component of the evaluation signal at the frequency B*$\Omega$, where the symbol "*" is used to represent multiplication.

Similarly, it produces a second acceleration signal $\gamma_{B-1}$ which represents the spectral component of the evaluation signal at the frequency (B-1)*$\Omega$.

It can thus be seen that the number of blades B represents, in fact, a harmonic coefficient.

A control circuit CC receives the two acceleration signals $\gamma_B$ and $\gamma_{B-1}$ to produce a beat level L that is a function of these signals.

Preferably, this beat level is given by:

$$L=[(\gamma_{B-1})^n]/\gamma_B$$

The power $n$ is advantageously equal to 2, but the invention applies regardless of the value of $n$. It is important to measure the difference between an $n^{th}$ power of one of the acceleration signals and the other acceleration signal.

Advantageously, the device further includes a comparator COMP which produces a warning signal AL if the beat level L exceeds a predetermined threshold TH.

Naturally, the present invention can be varied in numerous ways. Although one implementation is described above, it will readily be understood that it is not conceivable to identify exhaustively all possible implementations. It is naturally possible to envisage replacing any of the means described by equivalent means without going beyond the ambit of the present invention.

What is claimed is:

1. A device for indicating a beat level (L), the device comprising analyzer means (FT) which, in response to a reference frequency ($\Omega$) and to a harmonic coefficient (B) extracts the following from an evaluation signal (E);
    a first acceleration signal ($\gamma_B$) at a frequency equal to the product of said reference frequency ($\Omega$) multiplied by said harmonic coefficient (B); and
    a second acceleration signal ($\gamma_{B-1}$) at a frequency equal to the product of said reference frequency ($\Omega$) multiplied by said harmonic coefficient minus one;
    and the device further comprising a control circuit (CC) which receives said first and second acceleration signals ($\gamma_B$, $\gamma_{B-1}$) to produce said beat level (L),
    and wherein said beat level is equal to the ratio of the $n^{th}$ power of said second acceleration signal ($\gamma_{B-1}$) divided by the first acceleration signal ($\gamma_B$).

2. A device according to claim 1, further comprising a comparator (COMP) which produces a warning signal (AL) if said beat level (L) exceeds a predetermined threshold (TH).

3. A device according to claim 1, wherein the value of $n$ is equal to 2.

4. A device according to claim 1, wherein said evaluation signal (E) comes from a vibration sensor.

5. A device according to claim 1, including a concentrator member (MM) for producing said evaluation signal (E) in response to a plurality of measurement signals (C1, C2, and C3), each coming from a distinct vibration sensor (S1, S2, S3).

6. A device according to claim 5, wherein said evaluation signal (E) is equal to the sum of said measurement signals (C1, C2, C3).

7. A device according to claim 5, wherein said evaluation signal (E) is the greatest of said measurement signals (C1, C2, C3).

8. A device according to claim 1, wherein said reference frequency ($\Omega$) is derived from a tachometer (T).

9. A device for indicating a beat level (L) of a rotary wing aircraft having a rotor with a plurality of blades, the device comprising:
    a vibration sensor (S1, S2, S3) for measuring vibration on board the aircraft;
    a speed sensor (T) for measuring the speed of rotation of the rotor, the speed sensor providing a reference signal having a reference frequency ($\Omega$);
    a synchronous analysis means (FT) for synchronously analyzing harmonic components of a vibration signal (E) derived from the vibration sensor, the synchronous analysis means (FT) being connected to the vibration sensor and to the speed sensor, the synchronous analysis means (FT) being arranged to extract from the vibration signal (E):
        i) a first harmonic component ($\gamma_B$) of a frequency (B$\Omega$) equal to the product of said reference frequency ($\Omega$) multiplied by a harmonic coefficient (B) equal to the number of blades of the rotor, and
        ii) a second harmonic component ($\gamma_{B-1}$) of frequency (B-1) ($\Omega$) equal to the product of said reference frequency ($\Omega$) multiplied by said harmonic coefficient minus one (B-1);
    a control circuit (DC) connected to the synchronous analysis means (FT), the control circuit receiving said first and second harmonic components and outputting a beat level (L).

10. A device according to claim 9, further comprising a comparator which produces a warning signal (AL) if said beat level (L) exceeds a predetermined threshold (TH).

11. A device according to claim 9, wherein said beat level is equal to the ratio of the $n_{th}$ power of said second harmonic component ($\gamma_{B-1}$) divided by the first harmonic component ($\gamma_B$).

12. A device according to claim 11, wherein the value of $n$ is equal to 2.

13. A device according to claim 9, including a concentrator member for producing said vibration signal (E) in response to a plurality of measurement signals (C1, C2, and C3), each coming from a distinct vibration sensor.

14. A device according to claim 13, wherein said vibration signal (E) is equal to the sum of said measurement signals (C1, C2, C3).

15. A device according to claim 13, wherein said vibration signal (E) is the greatest of said measurement signals (C1, C2, C3).

* * * * *